United States Patent [19]

Kunze

[11] 4,071,263
[45] Jan. 31, 1978

[54] COUPLING HOOK FOR A THREE-POINT CONNECTION ON A TRACTOR

[75] Inventor: Dieter Kunze, Clarendon Hills, Ill.

[73] Assignee: Jean Walterscheid GmbH, Lohmar, Rhineland, Germany

[21] Appl. No.: 782,569

[22] Filed: Mar. 29, 1977

[30] Foreign Application Priority Data

Apr. 17, 1976   Germany ............................. 2617021

[51] Int. Cl.² ............................................. B60D 1/10
[52] U.S. Cl. ..................................... 280/508; 280/509
[58] Field of Search ................... 280/508, 509, 456 A, 280/460 A, 446 A, 461 A; 294/83 R

[56] References Cited

U.S. PATENT DOCUMENTS

| 2,429,761 | 10/1947 | Ketel | 280/508 |
| 2,783,059 | 2/1957 | Hartl | 280/509 |
| 2,951,711 | 9/1960 | Karnath | 280/508 |
| 3,539,203 | 11/1970 | Baugh | 280/509 |

*Primary Examiner*—Robert R. Song
*Attorney, Agent, or Firm*—Edmund M. Jaskiewicz

[57] ABSTRACT

A coupling hook for lockingly engaging a coupling pin on an implement or the like has a pocket having a slot in which a pivot element is slidably received and an operating lever is pivotally mounted to the pivot element. A latch is pivotally connected to the operating lever and has one end extending through a passage toward the hook opening. The latch is pivotable and slidable upon a supporting or guiding pin such that when a coupling pin acts upon an unlocking surface on the nose-portion of the latch during a coupling operation, the latch will slide back into the pocket to permit the coupling pin to be received within the hook opening. When the coupling pin is locked within the hook opening, the pin will bear against a locking surface on the nose-portion of the latch to urge the supporting surface of the latch against an edge of the passage through which the latch extends so that a moment is produced acting upon the latch and operating lever to urge the latch into the hook opening. The slot has a recess at one end thereof to receive the pivot element when the operating lever is pivoted in the unlocking direction beyond a predetermined angle such that the pivot element and thus the latch will be retained in an unlocked position until an extension on the operating lever is manually actuated to release the latch.

5 Claims, 3 Drawing Figures

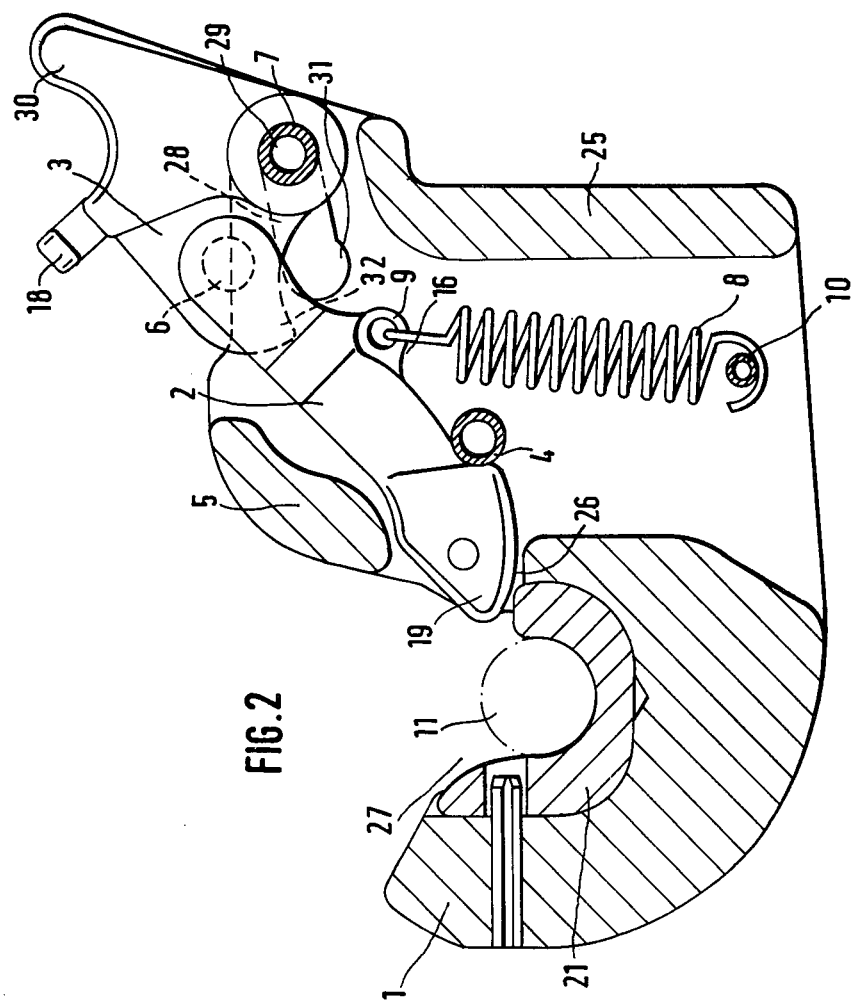

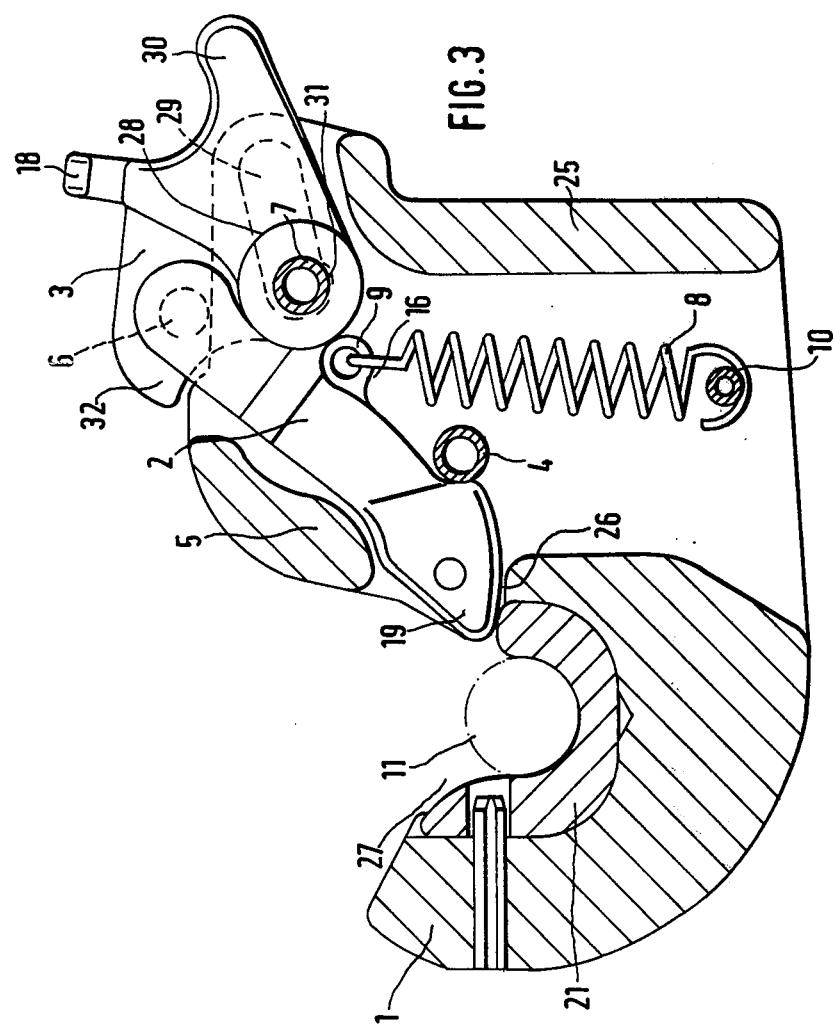

COUPLING HOOK FOR A THREE-POINT CONNECTION ON A TRACTOR

The present invention relates to a coupling hook for a three-point connection on a tractor for lockingly receiving a coupling pin on an implement or the like, more particularly, to the structure for locking the coupling pin in the jaw of the coupling hook in such a manner that the locking structure will either remain open or will close automatically at the end of a coupling operation.

Coupling hooks which are employed on the guide members of a three-point hitch or connection of agricultural tractors are generally provided with a form of a locking mechanism for securing a coupling pin associated with a trailer, agricultural implement or machine or the like in the jaw of the hook. Such a locking arrangement generally comprises a spring-loaded latch and an operating linkage connected to the latch.

One form of such a locking mechanism for a coupling hook is disclosed in the copending U.S. patent application No. SN 654 001 filed Jan. 30, 1976 by the same applicant and issued on Mar. 29, 1977 as U.S. Pat. No. 4,014,562. This coupling hook has a spring-loaded latch element projecting through a passage-way in a pocket in the hook in the direction toward the jaw opening so as to be lockingly engageable with a coupling pin received within the jaw opening. The latch element is pivotally connected to an actuating lever which in turn is pivotally mounted in the pocket. The latch element has one end in the form of a nose-portion which projects into the jaw opening and the nose-portion is tapered so as to define a curved operative locking surface and an inclined lock release surface. The latch element has a first supporting surface which is pivotable and slidable upon a pin within the pocket and has a second supporting surface engageable with an edge of the passage from the pocket. During a coupling operation, the coupling pin will act upon the latch lock-release surface to slide the latch upon the supporting pin into the pocket and when the coupling pin is locked within the hook opening the coupling pin will act upon the latch locking surface to urge the latch second supporting surface against the passage opening to produce a moment acting upon the latch and operating lever to urge the latch into the hook opening.

In this described coupling hook, the latch element will automatically return to the locking position as soon as the coupling pin has been seated within the hook opening. However, it has occurred that on many occasions the coupling pin has not been correctly engaged or seated in the hook opening but that the latch was automatically returned to the locking position. Such incorrectly engaged coupling pins present serious dangers in that serious damage and even accidents may occur, particularly with heavy equipment. Since the latch automatically returned to the locking position the tractor operator generally assumed that the coupling pin was correctly engaged and very seldom did the operator acertain the engagement of the coupling pin in the coupling hook until some mishap occurred.

It is therefore the principal object of the present invention to provide a novel and improved locking arrangement for a coupling hook employed on a three-point connection on agricultural tractors and the like.

It is another object of the present invention to provide such a coupling hook having a locking mechanism which can be manipulated in such a way that the lock will either remain in the open position after the coupling pin has been engaged or will close automatically at the end of the coupling operation.

It is a further object of the present invention to provide such a coupling hook having a locking arrangement which is capable of two different modes of operation but is structurally strong, simple and reliable in operation and inexpensive to maintain and manufacture.

According to one aspect of the present invention there is provided a coupling hook for a guide member of a three-point attachement of a tractor comprising a hook member having a hook opening in which is received a coupling pin of an implement or the like. There is a passage in the hook member between a pocket therein and the hook opening. The pocket is provided with a slot in which is slidably received a pivot element and an operating lever is pivotally mounted on the pivot element. A latch is pivotally connected to the operating lever and has one end extending through the passage toward the hook opening. The latch has a first supporting surface which is pivotable and slidable upon a guide surface which may be in the form of a pin within the pocket. The latch is also provided with a second supporting surface engageable with an edge of the passage.

The end of the latch extending toward the hook opening has an unlocking surface and a locking surface such that a coupling pin acting upon the latch unlocking surface during a coupling operation will slide the latch upon the guide surface into the pocket. When the coupling pin is locked within the hook opening the pin will act upon the latch locking surface to urge the second supporting surface of the latch against the edge of the passage to produce a moment acting upon the latch and operating lever to urge the latch into the hook opening.

The coupling hook locking mechanism of the present invention has the advantage that the locking mechanism is capable of two different modes of operation. The coupling hook may function as a conventional coupling hook in that during the coupling operation when the latch is moved to the open position by the coupling pin, the latch will be automatically returned to the locked position when the coupling pin is received within the hook opening. The tractor operator may also manipulate the operating handle such that when the latch is in the open position the pivot element of the operating handle will slide within its slot to a position wherein the operating lever and latch will be retained in the fully opened position. The operating lever will remain arrested in this fully opened position until the operator dismounts from the tractor seat and manually or with his foot moves the operating lever into the operative locking position. The dismounting by the operator thus enables him to check whether or not the coupling pin has been properly engaged in the coupling hook.

If the coupling hook is clearly visible to the driver under certain operating conditions such as when relatively light equipment is being connected to the tractor, the operator merely moves the operating lever with the aid of the cable attached thereto to such a position to open the lock mechanism only to a point to ensure safe coupling engagement of the coupling pin. The locking mechanism will then automatically close as soon as the cable is released. Under these conditions the operator need not dismount. Thus, two different modes of operation of the coupling hook mechanism are available to the operator and each may be used optionally depending upon conditions.

Other objects and advantages of the present invention will be apparent upon reference to the accompanying description when taken in conjunction with the following drawings, which are exemplary, wherein;

FIG. 2 is a view similar to that of FIG. 1 but showing the locking mechanism of the coupling hook in position for automatic closing of the latch; and FIG. 3 is a sectional view similar to that of FIG. 1 and showing the position wherein the locking mechanism is arrested to retain the latch in the open position.

Proceeding next to the drawings wherein like reference symbols indicate the same parts throughout the various views a specific embodiment and modifications of the present invention will be described in detail.

Figure 1:
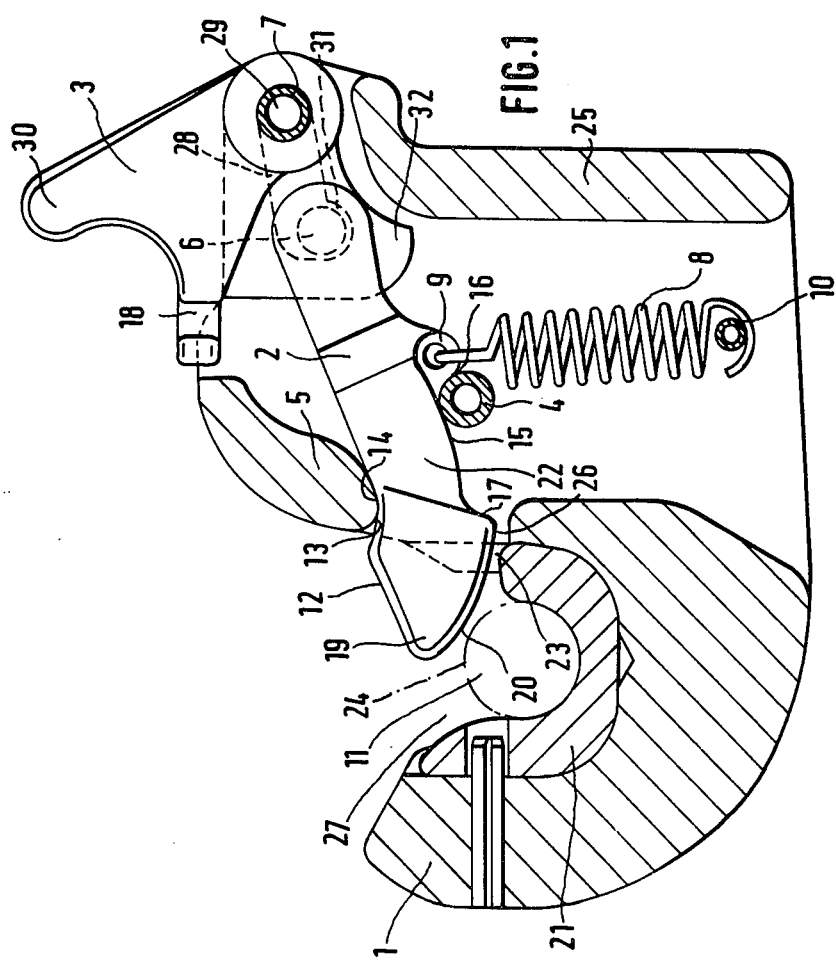
FIG. 1 is an elevational view in section of a coupling hook according to the present invention in its closed or locked position.

In FIG. 1 there is illustrated a coupling hook for a guide member in a three-point linkage for a tractor and comprising a hook member 1 in which is formed a pocket 25 and having a jaw to form a hook or jaw opening 27. In the hook opening there is pivotably mounted a semi-spherical liner or insert 21 which is shaped to receive the coupling pin 11.

Also positioned within the pocket 25 is the lock mechanism for the catch hook which includes a latch 2 having on one end thereof a nose-portion 19 which extends through a passage 26 toward the hook opening 27. The passage 26 thus communicates between the pocket 25 and the hook opening and is formed by a portion 5 on the lower edge of which is formed a support surface 13. On the lower surface of the passage 26 is formed a supporting surface 23. The nose-portion 19 of the latch is tapered so as to form on its upper surface an unlocking or lock release surface 12 and on its lower surface a locking surface 20. The upper surface of the latch 2 is provided with a supporting surface 14 which is engageable with the counter-surface 13 on hook portion 5 and a lower supporting surface 15 which is slidable and pivotable upon a supporting or guide bolt 4 located within the pocket 25.

The other end of the latch 2 is pivotally connected by a bolt 6 to an operating lever 3 which is pivotally connected upon a pivot bearing 7 which includes a bolt 29. The bolt 29 is slidably displaceable in an elongated slot 28 formed in the upper portion of the pocket 25 as shown in FIG. 1 and at the innermost end of the slot 28 there is formed a recess or notch 31 shaped to receive the pivot bearing 7.

The operating lever 3 has an eye 18 formed at an outer portion thereof so as to define an axis 18- 7 by means of which a torque is applied to the operating lever. A flexible cable or tube is attached to the eye 18 and extends toward the seat of the tractor for actuation by the tractor operator.

The operating lever 3 is also provided with an extension lug portion 30 which may be manually engaged by the tractor operator or may be kicked by foot to release the locking mechanism in a manner to be subsequently described.

The central portion of the latch 2 is indicated at 22 and has a reduced cross-section to extend between the bearing bolt 6 and the nose-portion 19. At a shoulder defined by the central portion 22 there is provided an upper mounting 9 for a tension spring 8 whose other end is connected to a lower spring mounting comprising a pin or bolt 10 within the pocket 25.

The lower supporting surface 15 is limited by a forward stop or abutment face 16 formed on an edge of the upper spring mount 9 and a rearward stop face or abutment 17 formed immediately beyond the nose-portion 19. The supporting bolt 4 thus slidably engages the latch 2 on the supporting surface 15 limited by the stops 16 and 17.

The operating lever 3 is provided with a terminal surface 32 so shaped to prevent the access of dirt into the opening to the catch-hook pocket 25 in which is positioned the operating lever 3.

The extension 30 thus provides for optional foot or hand operation of the locking mechanism. This is advantageous in that frequently lock mechanisms on coupling hooks are clogged with dirt and may be difficult to operate to open or closed positions by hand and the operator may thus have the resort to an additional kick against this extension.

DISCRIPTION OF OPERATION

Automatic locking of the lock mechanism.

In order to couple an implement or machine having a three-point linkage connection to the tractor, the tractor is driven in the reverse direction toward the machine so that the guide members with the coupling hooks thereon are positioned below the corresponding coupling pins of the machine. The guide members are then subsequently lifted such as by a hydraulic lifting structure generally found in agricultural tractors such that the coupling pins 11 on the implement are forced into the openings 27 of the hooks 1. As the coupling pin 11 engages the unlocking surface 12 on the nose-portion of the latch to create a turning moment about the bolt 4 when the pin 11 engages a particular point along the unlocking surface 12, the latch 2 will be pivoted about the bolt 4 and because of the resultant force thus applied to the latch the latch 2 will slide upwardly along the curved supporting surface 15 toward the operating lever 3.

This upward movement of the latch 2 will cause the bearing bolt 6 to be pivoted upwardly together with the operating lever 3 in an arcuate path about the pivot element 7 in the slot 28. As a result of the curved supporting surface 15 and the guided movement of the bolt 6 about the pivot element 7, the nose-portion 19 of the latch will describe a curvilinear path such that the latch 2 is moved completely out of the opening 27 to enable the coupling pin 11 to slide downwardly along the unlocking surface 12 to be seated into the hook opening 27 as shown in FIG. 2. Abutment surface 17 on the latch 2 will engage the bolt 4 as shown in FIG. 2 to stop movement of the latch 2 so as to prevent any load being transmitted to the rearward wall of the hook or to the liner 21.

When the coupling pin 11 has dropped into the opening 27 so as to be completely seated therein, the latch 2 will slide along its surface 14 against co-acting surface 13 and, pivoting about the bolt 6 as well as being guided by the bolt 29 in the slot 28, the latch will return to its intitial position together with the pivot element 7 to lock the hook 1 as shown in FIG. 1. The spring 8 will create a moment about the bolt 6 so as to minimize frictional forces between the surfaces 13 and 14 during the closing or locking movement of the latch 2. At the same time, the restoring force for the locking operation is increased.

Closed or locked position.

In its closed position as shown in FIG. 1, any forces and moments applied to the locking surface 20 on the latch by the coupling pin 11 will have the effect of locking the hook 1 by causing the latch surface 14 to bear against the counter-surface 13 which will act as a fulcrum such that the support surface 15 and the stop surface 16 will exert a downward force against the bolt 4. As result of these forces accidental disengagement or unlocking of the locking mechanism cannot occur.

Unlocking of the latch.

When it is desired to disengage the coupling pin 11 from the hook 1, the tractor operator exerts a force upon the eye 18 of the operating lever 3 by means of the operating cable in a vertical direction or along a straight line up to an angle of about 60° with the lever arm 7–18 as shown in FIG. 1. Pivoting of the operating lever 3 in a clockwise direction which is toward the unlocking direction will cause the bolt 6 to be pivoted upwardly in an arcuate path about the pivot element 7 which is positioned by its bolt 29 in the slot 28. The latch 2 is thus guided toward the counter-bearing surface 13 by a moment created by the spring 8 in the bolt 6 at the point of contact between the surfaces 13 and 14. The latch 2 is thus guided upwardly by the operating lever 3 and the engaging surfaces 13 and 14 so as to withdraw sufficiently the nose-portion 19 to open the opening 27 to release or unlock the coupling pin 11. This unlocking movement of the latch 2 does not involve any contact with the bolt 4 so that friction is significantly reduced during the unlocking phase.

Retaining the locking mechanism in the open position.

The tractor operator either by manipulating the cable attached to the eye 18 or by gripping the extension 30 pivots the operating lever 3 through an angle of greater than 90° in the opening direction. As the operating lever passes through this angle, the bolt 29 will slide in the slot 28 toward the left as viewed in the drawings to a position at the end of the slot 28 as shown in FIG. 3. The spring 8 will exert a force upon the latch 2 to cause the pivot element 7 to be pulled into the recess 31 at the end of the slot into the position as shown in FIG. 3. In this position, the operating lever 3 is immobilized or retained in position and the lock mechanism of the coupling hook remains open.

In order to close the mechanism, the operator may apply a vigorous push or kick to the extension 30 of the operating lever so as to disengage the bolt 29 from the recess 31 in the slot 28. Upon disengaging of the bolt 29 from the recess 31 the mechanism will close automatically as described above.

It is pointed out that the lock mechanism is so constructed that the mechanism will be capable of operation for locking as well as unlocking even if the tension spring 8 should break or otherwise be inoperative.

The force required for unlocking the lock mechanism can be significantly reduced, if so desired, by an appropriate extension of the lever arm 7–18.

When the pivot element 7 is engaged in the recess 31 at the end of the slot 28 the operating lever will be safely arrested in its terminal position with the locking mechanism fully opening. The locking mechanism cannot now close automatically and the operator must dismount from the tractor seat in order to lock the coupling hook by applying an appropriate force to the extension 30 of the operating lever.

It will be understood that this invention is susceptible to modification in order to adapt it to different usages and conditions, and accordingly, it is desired to comprehend such modifications within this invention as may fall within the scope of the appended claims.

What is claimed is:

1. A coupling hook for a guide member of a three-point attachment of a tractor comprising a hook member having a hook opening to receive a coupling pin on an implement and the like, said hook member having a pocket therein and there being a passage between said pocket and said hook opening, there being a slot in said pocket and a pivot element slidably received within said slot, an operating lever pivotally mounted on said pivot element and said pivot element being slidable in said slot when said operating lever is pivoted to a predetermined angle, a latch pivotally connected to said operating lever and having one end extending through said passage towards said hook opening, means defining a guide surface within said pocket and said latch having a first supporting surface pivotable and slidable on said guide surface, said latch having a second supporting surface engageable with an edge of said passage and said one end of said latch having an unlocking surface and a locking surface such that a coupling pin acting upon said latch unlocking surface during the coupling operation will slide said latch upon said guide surface into said pocket and when a coupling pin is locked within said hook opening said coupling pin acts upon said latch locking surface to urge said latch second supporting surface against said passage edge to produce a moment acting upon said latch and operating lever urging said latch into said hook opening.

2. A coupling hook as claimed in claim 1 wherein said operating lever is pivotable in a direction to unlock said latch with respect to a coupling pin in said hook opening such that the pivoting to a predetermined angle will unlock said latch and further pivoting beyond said angle will cause said pivot element to slide in said slot to a position wherein said latch is held in the open position.

3. A coupling hook as claimed in claim 1 and means interacting between said operating lever and said latch for holding the latch in the open position when the operating lever is pivoted beyond a predetermined angle.

4. A coupling hook as claimed in claim 1 wherein there is a notch at one end of said slot to receive said pivot element after said pivot element has been slidably displaced within said slot.

5. A coupling hook as claimed in claim 1 and an extension on said operating lever for actuating said operating lever.

* * * * *